C. W. McKIBBEN.
APPARATUS FOR SEPARATING LIQUIDS.
APPLICATION FILED NOV. 24, 1917.
1,276,386.                                       Patented Aug. 20, 1918.
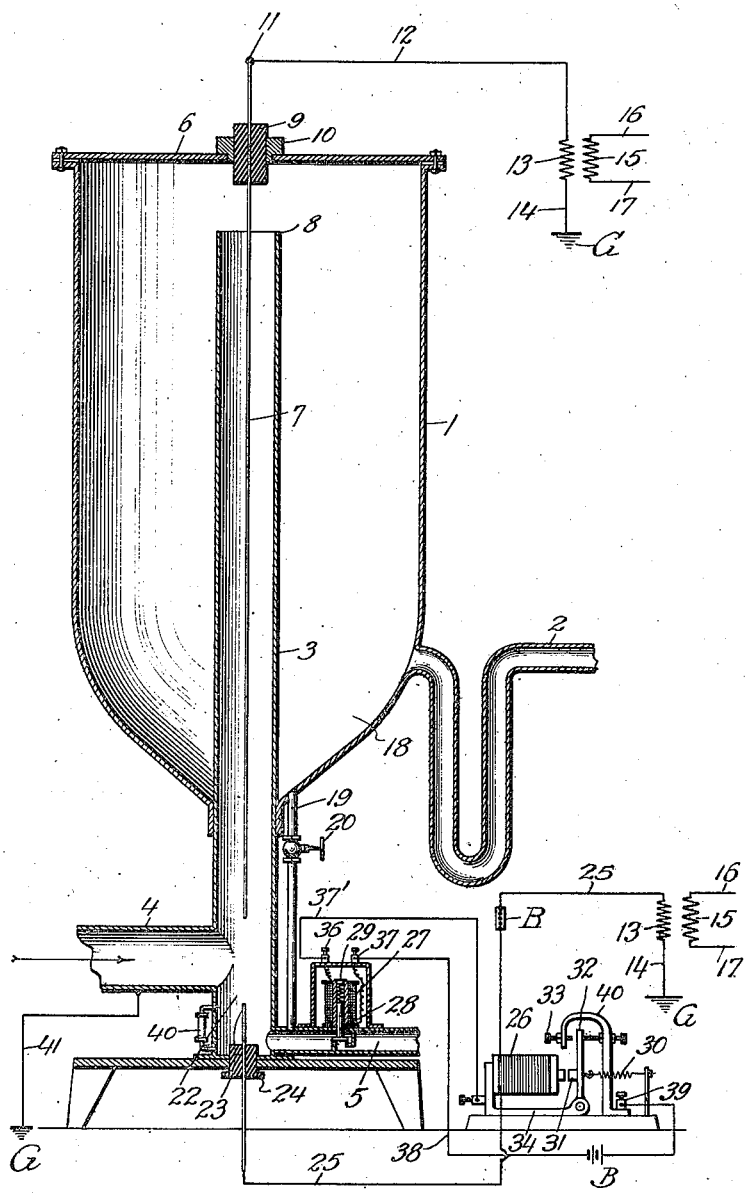

UNITED STATES PATENT OFFICE.

CHARLES W. McKIBBEN, OF HOUSTON, TEXAS.

APPARATUS FOR SEPARATING LIQUIDS.

1,276,386.　　　　　Specification of Letters Patent.　　Patented Aug. 20, 1918.

Application filed November 24, 1917.　Serial No. 203,695.

*To all whom it may concern:*

Be it known that I, CHARLES W. MCKIBBEN, a citizen of the United States, residing at Houston, in the county of Harris and State of Texas, have invented certain new and useful Improvements in Apparatus for Separating Liquids, of which the following is a specification.

My invention relates to improvements in apparatus for separating one liquid from another and has special reference to means for rapidly and effectually dehydrating petroleum oil emulsions.

One of the specific objects of the invention is to provide a container or treater, within which liquids of different specific gravity and differing in specific electrical conductivity may be separated, with particular reference to the separation of entrapped water from crude oil, as when these liquids are found in emulsified association.

In a copending application for a method of separating emulsified liquids, which is identified by Serial No. 207,174 I have shown the treater, herein described and claimed, in connection with other means and apparatus for carrying that method of operation into effect.

In the accompanying drawings, 1 is an enlarged outside casing having a trap discharge conduit 2 for the dehydrated oil and surrounding a vertical, centrally disposed pipe 3. The pipe 3 is provided with an inlet opening 4 through which the emulsion is to pass into the pipe 3 and casing 1. It is also provided with a discharge opening, or pipe 5, through which water, precipitated from the emulsion is automatically discharged. The casing 1 is closed by a cover
6. A metal rod or wire 7 depends therefrom, located in the center of the pipe 3, and extends from the upper end 8 to a point near the entrance pipe 4. It is held in its position by an insulating plug 9 which is secured in the cover 6 by a bushing 10. The rod or conductor 7 is connected, as at 11, by a wire 12 to the secondary coil 13 of the transformer, the other end 14 of which is connected to the ground, as at G. The primary coil 15, of the transformer, is in inductive relation to the secondary coil 13, as in devices of this character, and its terminals 16 and 17 are connected to the proper source of electric alternating current.

In the use of the treater oil is admitted into the opening 4, from whence it will pass at suitable velocity into the vertical tube 3, and through the electrical field of high potential existing between the electrode 7 and inner wall of the tube 3. It will then overflow, at the end 8, and pass into the casing 1, when the purified oil will flow out through the trapped conduit 2 to the proper reservoir provided to receive it. The liberated water, that may settle out of the oil that has been treated, after passing through the pipe 3, will be contained in the bottom chamber 18 of the casing 1. A pipe 19 is connected to the bottom chamber 18, controlled by the valve 20, communicates with the discharge pipe 5, so that the chamber 18 may be open to the discharge pipe, when desired, if it is found that any great amount of water settles in said chamber. When the emulsion passes upwardly through the pipe 3, and through the electric field therein, which is of sufficiently high electrical potential to produce the desired effect, the film tension between the various water particles will be thus broken down, causing the globules of water to coalesce in larger drops of free water which will gravitate to the bottom of tube 3. The chain of globules that may be established between the inner wall 3 and the conductor 7 is broken up and prevented from short-circuiting the electric current by the effect of the rapid upward flow of the emulsion through the pipe 3. As the separation thus effected takes place the heavier particles of water will settle in the bottom portion 22, of the pipe 3 below the opening 4 in which there is a central conductor or electrode 23 insulated by a plug 24. The conductor or electrode 23 is connected by a wire 25, through relay coils 26 and a variable resistance R to the secondary 13 of the transformer. The other end of the coil is connected by a wire 14 to the ground G. This may be the same transformer as that shown in the upper part of the drawing, or a separate transformer, or other source of electric current may be used for the purpose if desired.

An electro-magnet 27 controls a valve 28 that is normally held upon its seat in the pipe 5 by spring 29. When the current passing between the electrode or conductor 23, in the lower part of the pipe 3, and the pipe, is sufficient to energize the coil 26 of the relay, against its retractile spring 30, the armature

31 will be attracted toward the magnet 26 until the tongue 32 makes electrical connection with the contact 33. This closes the local circuit through a part 34 over the wire 37' to the binding post 36 and through the coil 27 to the binding post 37, over the wire 38 to the battery B, back to the binding post 39 and through the standard 40 to the contact 33. This will energize the electro-magnet 27, causing it to raise the valve 28, whereupon the water in the lower part 22 of the pipe 3 will be discharged. The water is a much better conductor than the oil or emulsion and should the lower part 22 of the pipe 3 be filled with the emulsion, instead of the entrained water, the resistance between the electrode 23 and the inner surface of the pipe 3, is too high to permit sufficient current to flow through the electro-magnet 26, of the relay, to attract the armature thereof, and therefore the circuit will not be closed in the manner described, and the valve 28 will remain closed. As the water descends, however, from the upper part of the pipe 3, due to its elimination by the electrical process referred to, the oil that is contained in the lower chamber 22 of the pipe will rise, being displaced by the gravitation of the water, until the water has sufficiently accumulated in this chamber to reduce the resistance sufficiently to cause a proper amount of current to flow through the relay and thus automatically open the discharge valve. After the discharge opening has permitted the water to drain out, more oil, or emulsion will fill the chamber 22, thus increasing the electrical resistance between the electrode 23 and the inner surface of the pipe 3, which will cause the retractile spring 30 of the relay to draw back the tongue 32 from its connection with the contact 33, thus opening the local circuit through the valve magnet 27, and permitting the spring 29 thereof to close the valve 28.

A water glass 40 may be connected to the upper and lower ends of the chamber 22 to visually indicate the character of liquid contained in the chamber. A wire 41 is connected to the pipe 4 and to the ground G.

The art of separating water from oil, while the two liquids are in an emulsified state, by passing the emulsion through a highly charged electric field, which arranges the globules of water in chains and then breaking down the skin tension of the oil envelop that entraps the water, is well known and does not require further description, but such a process is fully disclosed in my copending application, heretofore adverted to.

The time constant of the fluid passing a given point through the treater is relatively short and the effect of the velocity of the fluid breaks up or annihilates the chains of bubbles, or globules of water that are brought into polar alinement by the effect of the electric current the duration of which would short-circuit the electric current that produces this effect, and the distance between the electrodes producing the field through which the liquid passes, is so relatively short, as to cause the liquids to absorb considerable electric power and therefore it is possible, with this device, to treat a large quantity or volume of oil, or emulsion, rapidly, thereby making the separation clear, clean cut and rendering the device very efficient.

Having described my invention, what I claim is:—

1. An apparatus for separating liquids, differing in specific gravity and electrical resistance, when associated as in emulsions, comprising a vertically disposed casing providing a conduit for an emulsion in the upper part thereof; a settling chamber for the heavier liquid, below said conduit; means in the conduit to separate the liquids as they pass therethrough; electrodes in the settling chamber; a drain pipe connected to the settling chamber; a valve in said pipe; an electro-responsive device, for connection to said electrodes for controlling said valve, whereby, when energized, to automatically open the valve to discharge the heavier liquid from said settling chamber upon a predetermined resistance of the contents of said chamber.

2. An apparatus for separating liquids, differing in specific gravity and electrical resistance, when associated as in emulsions, comprising a vertically disposed casing open at or near the top end and closed at the bottom end, having an entrance opening for the emulsion intermediate said ends, providing a conduit thereabove; a settling chamber below said inlet opening having a drain opening, in combination with an electric conductor centrally disposed in said conduit portion of the casing, whereby to produce, when energized, an electric field in said conduit through which the emulsion passes; an electric conductor in the settling chamber; a valve controlling the drain opening and an electro-responsive device for connection to the conductor in said settling chamber for operating said valve, when energized.

3. An apparatus for separating liquids, differing in specific gravity and electrical resistance, when associated as in emulsions, consisting of a vertically disposed conduit, having an upper and a lower opening; a casing, surrounding the upper discharge end of the conduit; a pipe, connected to the lower opening of the conduit, below the casing, to admit the emulsion; a discharge conduit connected to said chamber above its bottom end to leave the settling chamber therein; another settling chamber below said conduit and connected thereto; a discharge pipe communicating with said settling chambers; a valve in said discharge pipe; means in said conduit to dis-associate said liquids, whereby said heavier liquid will displace the lighter liquid in said settling chambers, and electro-responsive means, operatively affected by the heavier liquid, to control said discharge valve, when energized, to discharge said settling chambers of said heavier liquids.

In testimony whereof I hereunto set my hand in the presence of two subscribing witnesses.

CHARLES W. McKIBBEN.

In the presence of—
G. W. FOLLIN,
A. B. MAERCKY.